United States Patent [19]

Janes

[11] Patent Number: 5,678,408
[45] Date of Patent: Oct. 21, 1997

[54] PERFORMANCE ENHANCED GAS TURBINE POWERPLANTS

[75] Inventor: Clarence W. Janes, Sacramento, Calif.

[73] Assignee: California Energy Commission, Sacramento, Calif.

[21] Appl. No.: 550,716

[22] Filed: Oct. 31, 1995

Related U.S. Application Data

[60] Division of Ser. No. 263,519, Jun. 22, 1994, Pat. No. 5,535,584, which is a continuation-in-part of Ser. No. 182,661, Jan. 12, 1994, Pat. No. 5,490,377, which is a continuation of Ser. No. 139,525, Oct. 19, 1993, abandoned.

[51] Int. Cl.$^6$ .................................................. F02C 7/143
[52] U.S. Cl. .................................................. 60/728
[58] Field of Search ........................... 60/39.12, 39.5, 60/39.511, 39.53, 39.55, 728

[56] References Cited

U.S. PATENT DOCUMENTS

| | | |
|---|---|---|
| 2,625,012 | 1/1953 | Larrecq . |
| 2,633,707 | 4/1953 | Hermitte et al. . |
| 3,166,902 | 1/1965 | Maljanian et al. . |
| 3,785,145 | 1/1974 | Amann . |
| 3,949,548 | 4/1976 | Lockwood, Jr. . |
| 3,969,892 | 7/1976 | Stettler et al. . |
| 3,987,631 | 10/1976 | Heller et al. .................. 60/39.5 |
| 4,182,127 | 1/1980 | Johnson . |
| 4,244,191 | 1/1981 | Hendriks .................... 60/728 |

(List continued on next page.)

FOREIGN PATENT DOCUMENTS

| | | |
|---|---|---|
| 0150990 | 8/1985 | European Pat. Off. . |
| 15917 | 2/1977 | Japan . |
| 6093132 | 5/1985 | Japan . |
| 851940 | 10/1960 | United Kingdom . |
| 2227796 | 8/1990 | United Kingdom . |
| 2232721 | 12/1990 | United Kingdom . |
| 2264539 | 9/1993 | United Kingdom . |

OTHER PUBLICATIONS

CEC; "Chemically Recuperated Gas Turbine . . . and Reheat (1992) Gas Turbine World", p. 37.
The HAT Cycle; Electric Power Research Institute; undated.
Janes, C.W.; "Increasing Gas Turbine Efficiency . . . " (1979).
Amer. Chem. Society, 799423, pp. 1968–1972.
Makansi, J.; "Developments to Watch . . . " (1990) Power Magazine vol. 34, No. 6.

*Primary Examiner*—Louis J. Casaregola
*Attorney, Agent, or Firm*—John P. O'Banion

[57] ABSTRACT

An intercooled gas turbine driven powerplant employing a high pressure two-pass heat exchanger down stream of the final stage of compression is disclosed herein. The flow of hot, highly compressed air is cooled in the first pass of the high pressure heat exchanger by a counter current in-tube flow of either water alone, or preferably, of a cold methane/water mixture. The flow of air, thus cooled, is then available, in the second pass of the high pressure heat exchanger, to accept exhaust heat or the low grade heat, usually rejected, that is found in the heated fluid from the intercooler. The cool air is thus preheated, by the return to the cycle of exhaust heat, intercooler heat, and/or low grade heat from the operation of ancillary equipment prior to its entry into the combustor. Additionally, if a methane/water two phase feed is used to cool the first stage of the heat exchanger, the superheated mixture of steam and methane produced by the heat exchanger provides the ingredients to produce a low $NO_x$ fuel for the gas turbine combustor. Thus the first pass of the high pressure heat exchanger cools the high pressure discharge air flow and simultaneously generates the low $NO_x$ fuel gas (or if water alone is used, a quantity of steam for use in any industrial process). The second pass of the high pressure heat exchanger reheats the air flow with the exhaust heat or intercooler heat and simultaneously cools the water (or other heat transfer fluid) and returns that cold fluid to the intercooler or exhaust heat exchanger.

3 Claims, 10 Drawing Sheets

U.S. PATENT DOCUMENTS

| | | |
|---|---|---|
| 4,765,142 | 8/1988 | Hakhamkin . |
| 4,858,428 | 8/1989 | Paul . |
| 4,872,307 | 10/1989 | Nakhamkin . |
| 4,885,912 | 12/1989 | Nakhamkin . |
| 5,095,693 | 3/1992 | Day . |
| 5,133,180 | 7/1992 | Horner et al. . |
| 5,161,365 | 11/1992 | Wright . |
| 5,313,790 | 5/1994 | Barr . |
| 5,347,806 | 9/1994 | Nakhamkin . |

PERFORMANCE ENHANCED GAS TURBINE POWERPLANTS

CROSS REFERENCE TO RELATED APPLICATIONS

This application is a divisional of application Ser. No. 08/263,519 filed on Jun. 22, 1994 (Pat. 5,535,584), which is a continuation-in-part of Ser. No. 08/182,661 filed on Jan. 12, 1994 (Pat. 5,490,377) which is a continuation of Ser. No. 08/139,525 filed on Oct. 19, 1993 (Abandoned), the disclosures of which are incorporated by reference herein.

BACKGROUND OF THE INVENTION

1. Field of the Invention

This invention pertains generally to gas turbine engine driven powerplants, and more particularly to a gas turbine driven powerplant in which compression of the air is staged, allowing removal of the "heat of compression" from the partially compressed air between stages through the use of an "intercooler." Through the present invention, the heat removed by the intercooler, normally rejected in a cooling tower, and thus lost to the typical intercooler cycle, is recovered and restored to the cycle by means of a unique two-pass high pressure heat exchanger positioned downstream of the final compressor stage. Alternatively, if there is not sufficient intercooler heat to make its recovery important, the unique two-pass high pressure heat exchanger can be used to recover exhaust heat.

2. Description of the Background Art

Gas turbine engines are in wide use, and are ever more often the prime mover of choice. For example, the jet engine is an example of a successful gas turbine application since gas turbine engines have no equal for powering large aircraft. While the modern jet engine is the product of over 50 years of engineering development, the jet engine must fly and, therefore, the design options to enhance performance are necessarily limited. On the other hand, ground applications of advanced aircraft gas turbine engines allow use of additional performance enhancing techniques. In the air or on the ground, however, the principal long term route to increased powerplant performance has been through higher engine compression ratios and higher firing temperatures.

Higher firing temperatures have evolved through a succession of innovative cooling strategies involving compressor bleed air used as turbine coolant to maintain acceptable limits on sustainable temperatures seen by the turbine's metal alloys. Compressor bleed air flow, however, reduces gas turbine power and efficiency. The ever higher compression ratios also necessarily mean higher compressor discharge air temperatures, thereby limiting bleed air cooling effectiveness and requiring additional bleed air flows of the high temperature, high pressure air to effect the same metal cooling. The present invention, as will be shown, will enable metal component cooling with compressor discharge air at or near ambient temperatures. The new coolant, it will be shown, will allow for a significant reduction in bleed air required and/or a significant increase in firing temperature and/or both.

The new coolant will also allow creation of a low temperature heat sink. Low grade heat is normally too cool to be recovered and recycled and, therefore, generally requires continuous removal and rejection to the surroundings by means of a cooling tower or the like. Such heat is generated during operation of ancillary powerplant equipment from sources such as friction in the bearings of the generator and of the gas turbine, and appears in the hot lubricating oil. Low grade heat is also produced by the generator windings in the form of "copper losses," amounting to as much as 0.5 to 1.5 percent of the electrical energy generated, and is generally continuously removed by means of a water cooling loop. Also, the electrical transformer experiences "iron losses" due to the hysteresis effect in the iron core of the transformer. This significant heat load is carried away in the circulating transformer oil, and the heat in the hot oil is rejected to the atmosphere by means of air blast heat exchangers. Economic recovery of this low grade heat for return to the cycle is not possible without a low temperature heat sink which is allowed by this invention.

Another strategy for increasing the power and efficiency of gas turbine powerplants has been to intercool the air between compressor stages. Intercooling allows the high pressure compressor to achieve its designed high pressure air flow with considerably less work, thus increasing efficiency by reducing the deduction of shaft work for compression and allowing more of the shaft work to generate power. One problem with intercooling is that the significant amount of heat extracted from the partially compressed air is difficult to capture and thus most designs assume that this heat will be rejected. Even rejecting this heat, intercooling is an effective strategy for increasing performance. Conventionally, the heat exchange in the intercooler is effected by flowing the hot compressed air across finned tubes counter current to the in-tube flow of cold water. The cooled air from the intercooler is then compressed further before entering the high pressure combustor. The flow of heated water from the intercooler is typically routed to a cooling tower where the heat is rejected to the surroundings and thus lost to the cycle.

Therefore, there is a need for a method and apparatus for recapturing the intercooling heat, returning it to the cycle or producing useful steam and thus providing a substantial additional boost in overall plant efficiency. The present invention satisfies that need, as well as others, and overcomes the deficiencies in prior art powerplant designs.

SUMMARY OF THE INVENTION

In a conventional gas turbine driven powerplant, the high temperature compressor discharge air mainly flows directly into the combustor, but a significant portion of the high pressure air is bled off and is necessarily routed away and used to cool metal components. Compressor discharge air, although at a high temperature, is the only air available at a sufficient pressure to effect the necessary cooling of the high pressure turbine hot sections. There are also a number of places in a commercial powerplant where low temperature heat is lost because there is no economical method of returning it to the cycle to produce more useful work. In advanced designs calling for intercooling between compressor stages, this heat rejection problem would be particularly acute. The present invention provides an economical means to recapture this energy and eliminate the capital and operating costs of equipment that would have been necessary to reject heat.

By way of example, and not of limitation, the present invention positions one or more intercoolers between compressor stages (for purposes of this discussion only one intercooler is assumed) and a dual heat exchanger down stream of the high pressure compressor. Both the intercooler and the dual heat exchanger comprise vessels containing coils of tubing through which a fluid is pumped in order to effect an exchange of heat between the fluid inside the tubes and the air flow outside the tubes. In one set of tubes, a recirculating stream of fluid (closed loop) is maintained between the intercooler and the second stage of the dual heat exchanger. In another set of tubes, contained in the first stage of the dual heat exchanger, a separate, one way flow of fluid is maintained. Partially compressed air exiting the low or intermediate stage compressor is routed through the intercooler past the coils containing a cold fluid flowing in a countercurrent stream. This device simultaneously cools the partially compressed air and heats the fluid flowing counter current in the intercooler coils. The cooled air then enters the high pressure compressor. Upon exiting the high pressure compressor, the air temperature is again elevated, and the air then flows through the two stages of the high pressure heat exchanger. This device is also a vessel and it contains two sets of coils. The coils on the compressor discharge side of the heat exchanger (first stage) contain either a counter current flow of cold water for production of steam or a counter current flow of a cold combustible/water (fuel) mixture to produce a highly desirable low pollutant producing high temperature, diluted fuel (potentially hydrogen rich) which would be directed to the combustor. This counter current flow of water or combustible/water (fuel) cools the high temperature compressed air several hundred degrees Fahrenheit. The first stage of the dual heat exchanger thus produces a far more effective cooling medium for the turbine metal components than the standard uncooled high pressure air and also allows a heat sink to be created for the return to the cycle of low grade heat that cannot be captured in conventional powerplant designs. When the cooled compressed air reaches the end of this first set of coils, a small portion of the cooled compressed air is taken for cooling duties and the remaining air flows past a second set of fluid containing coils (second stage) and into the combustor. This second set of fluid containing coils contains the fluid that carries away heat from the intercooler. This heated fluid flows in a counter current in such a way as to simultaneously reheat the cooled compressed air on its way from the first stage of the dual heat exchanger to the combustor and cool the fluid in the tubes for return to the intercooler coils for further cooling duty. In this manner, virtually all of the heat extracted by the intercooler is returned to the fully compressed air before it enters the combustor, providing a substantial reduction in cycle energy losses.

In most gas turbine powerplants, a critical economic decision must be made whether and how to recuperate exhaust heat which flows up the stack after the turbines have extracted work from the expansion of high temperature and high pressure gas that occurs from combustion of the fuel. In a simple cycle powerplant, this exhaust heat is simply rejected in order to keep the plant simple and keep its capital cost low. In a combined cycle powerplant or a cogeneration powerplant, a portion of the exhaust heat is extracted by means of a heat recovery steam generator and the steam is used either to power a secondary turbine (a steam turbine or bottoming cycle) or for industrial processes in a cogeneration facility. A third option for use of the steam is to inject all or a portion of it into the combustor to increase the mass flow and thus augment the power output of the gas turbine powerplant.

The invention is presented herein in ten embodiments. The first, second and fourth embodiments correspond to these three choices for use of the exhaust heat. The third embodiment is a variation of the second embodiment, the difference residing in the manner in which fuel is injected into the combustor. The fifth and seventh embodiments employ a separate closed loop of heat exchange fluid to perform the high temperature exhaust heat exchange duties.

In the fifth embodiment, which is an enhancement of the previous "simple cycle" designs, the second pass of the dual heat exchanger will accomplish reheating of the high pressure compressor air in two stages. The first stage will be the portion of the second pass where the air passes over the coils of the closed loop that flows between the intercooler and the dual heat exchanger. The second stage will be an additional set of coils carrying heat exchange fluid in a separate closed loop between the high temperature exhaust heat exchanger and the dual heat exchanger. Employment of this separate closed loop is expected to permit more efficient recovery of the highest temperature exhaust heat without requiring steam raising.

The seventh embodiment employs the same concept as an enhancement of the previous "steam injected" designs. In this embodiment, additional exhaust heat not recovered by the high temperature exhaust heat exchanger is recovered by a heat recovery steam generator as in the fourth embodiment, but in this case less water is required to recuperate exhaust heat because the high temperature exhaust heat exchanger employed in the fifth embodiment has already recovered a significant amount of the exhaust heat. In addition, in the seventh embodiment, the steam (or preferably the steam/fuel mixture) produced in the exhaust heat recovery steam generator is injected into the flow of high pressure air between the first and second stages of the second pass of the dual heat exchanger. This increases the mass flow through the second pass of the dual heat exchanger and provides more efficient recovery of high temperature exhaust heat.

The fifth and seventh embodiments each may also incorporate one additional feature as well. It is anticipated that the temperature of the high pressure compressor discharge air in an intercooled cycle will be significantly lower than the temperature of the exhaust as it exits the power turbine. Because this high pressure compressor discharge air temperature controls the temperature of the steam/fuel mixture created in the in-tube side of the first pass of the dual heat exchanger, if the high pressure compressor discharge air temperature is significantly lower than the power turbine exhaust temperature, the steam/fuel mixture will also be well below that exhaust temperature, thus allowing the steam/fuel to accept high temperature exhaust heat. In order to accomplish this, an additional heat exchanger may be installed. The purpose of this small heat exchanger (which may be called the "steam/fuel temperature boost heat exchanger") would be to allow the steam fuel mixture exiting the first pass of the dual heat exchanger to absorb additional heat from the high temperature exhaust heat exchanger. This will permit more exhaust heat to be absorbed and returned to the cycle before water is required for possible additional heat recuperation. It also balances the mass flow being heated with the mass flow of the exhaust being cooled, thereby increasing heat exchange effectiveness. The sixth and eighth embodiments correspond to the fifth and seventh embodiments with the addition of the aforementioned steam/fuel temperature boost heat exchanger.

The first eight embodiments of the invention are predicated on the assumption that large amounts of heat are being removed by the intercooler and that recovery of this normally rejected heat by the high pressure dual heat exchanger is the best way to employ this unique technology. However, there may be situations in which the amount of heat being rejected in intercooling between compressor stages is not sufficient to warrant the use of the dual heat exchanger to recuperate that heat. In those situations, the second stage of the dual heat exchanger can be used to recover exhaust heat. Thus in the ninth embodiment of the invention, a cooling tower is used to reject intercooler heat and the second stage of the dual heat exchanger is connected in a closed heat exchange loop to the exhaust heat exchanger. This allows most, but not all, of the recoverable exhaust heat to be recuperated without raising steam in the exhaust heat recovery unit. In the tenth embodiment, the remaining recoverable exhaust heat is recuperated by once-through steam raising through the addition of an additional exhaust heat exchanger that employs a two phased feed of air and water to simultaneously recuperate exhaust heat and raise steam for injection into the combustor to augment mass flow and increase power generation.

This application is related to my copending application Ser. No. 08/182,661 in that a core element of both inventions is to use a high pressure heat exchanger following the final compressor stage in order to produce a superior coolant for a variety of purposes and, in most cases, to simultaneously produce a superior fuel for the combustor. Those skilled in the art will recognize that many specific applications of the superior coolant and further possibilities for recovering more heat and producing superior fuel are contained in that copending application and, for the sake of brevity, are not repeated in this application. It is noted, however, that such techniques could also be employed in conjunction with the technology described herein. Failure to repeat all such options in this application should not be construed to preclude protection of combinations of technologies discussed separately in the two applications.

An object of the invention is to utilize the most efficient aircraft engine available in serial production, with the minimum of modifications and development time and cost, as the prime mover in a ground based power plant.

Another object of the invention is to provide an effective source of high pressure cooling air several hundred degrees Fahrenheit lower in temperature than the cooling air normally available to the gas turbine designers (i.e. provide means to obtain significantly higher firing temperatures and/or reduce bleed air requirements).

Another object of the invention is to generate a low-$NO_x$ fuel that will, when burned in a combustor, reduce emissions of $NO_x$ to meet or exceed air quality emission limitations without the use of selective catalytic reduction (SCR)/ammonia (i.e. generate a hydrogen-rich sulfur free, highly steam diluted fuel).

Another object of the invention is to generate more thermal power (heat release) per mass flow of inlet air to the gas turbine than any previous gas turbine power plant (achieve practical levels of oxygen depletion from higher firing temperatures available as a result of this invention and from the use of dilute fuels available as a result of this invention).

Another object of the invention is to convert the energy released in the combustion of natural gas into shaft work with greater efficiency than any previous gas turbine powerplant (i.e., leave a minimum of residual energy in the stack gas, the only significant source of energy unconverted to shaft work).

Another object of the invention is to specify a gas turbine powerplant such that it can be operated unmanned, but with a higher level of durability, reliability, availability, and maintainability than achieved by any previous gas turbine powerplant (i.e. no steam cycle and employ once-through and closed loop heat exchangers).

Another object of the invention is to lower the gas turbine driven powerplant's stack temperature to the dew point (i.e. facilitate future economic recovery and recycle of the water vapor in the stack gas flow).

Another object of the invention is to create a sink for low grade heat that is presently rejected from typical gas turbine powerplants and return that heat to the cycle.

Another object of the invention is to provide an economical way of recovering heat from one or more compressor intercoolers in order to return that heat to the cycle and reduce overall plant energy losses.

Another object of the invention is to provide a design that is flexible and can be used in different configurations (e.g. "simple cycle," "combined cycle," "cogeneration," and "steam injected") to match anticipated load cycles and other differing economic parameters.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Referring more specifically to the drawings, for illustrative purposes the present invention is embodied in the apparatus schematically shown in FIG. 1 through FIG. 10 where like reference numerals correspond to like elements. It will be appreciated that the apparatus may vary as to configuration and as to details of the parts without departing from the basic concepts as disclosed herein.

Figure 1:
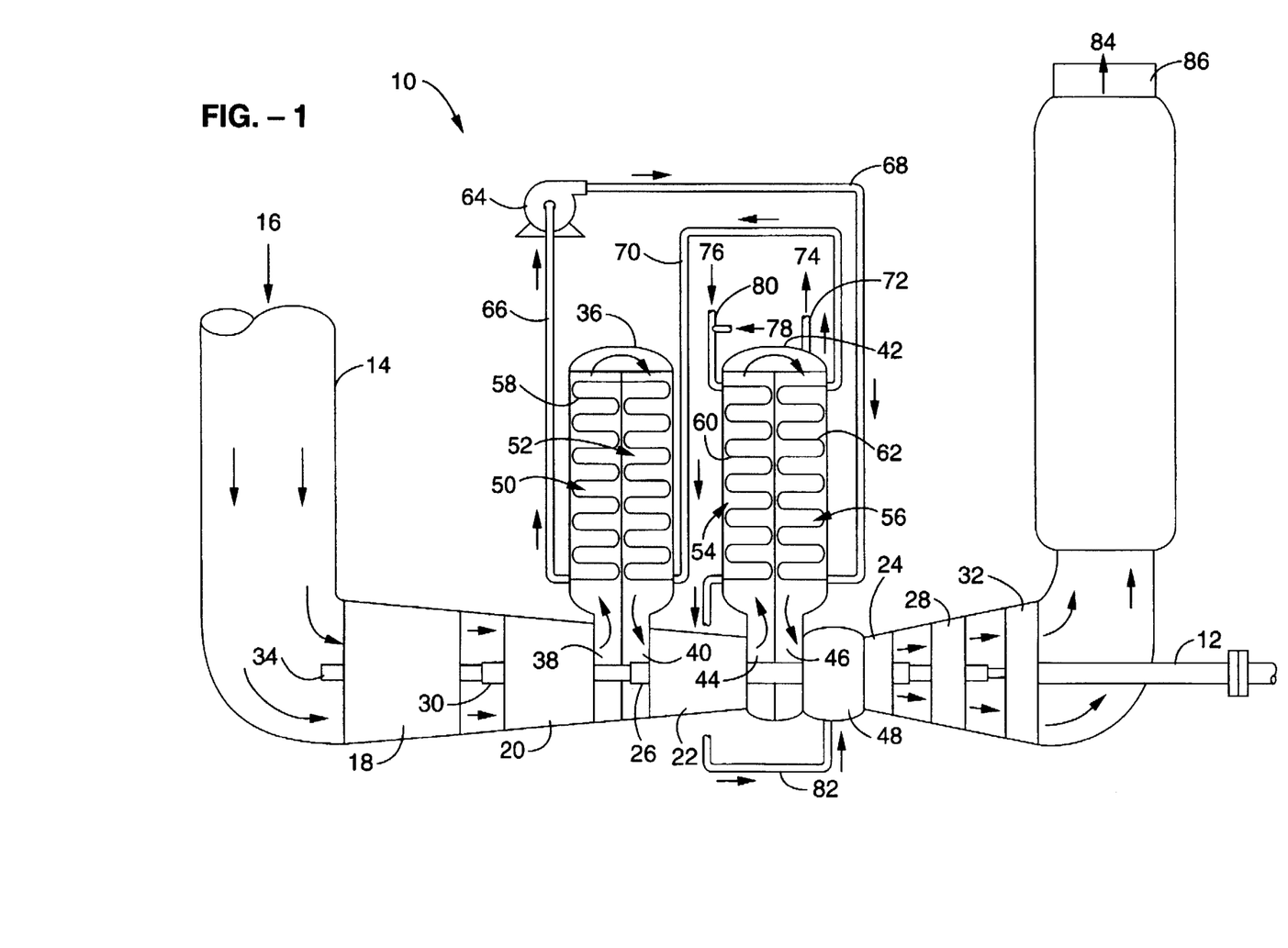
FIG. 1 is a schematic diagram of a "simple cycle" gas turbine driven power plant in accordance with the present invention showing an intercooler between compressor stages, and a dual heat exchanger down stream of the compressor.

Referring to FIG. 1, a gas turbine driven powerplant 10 is shown for delivering shaft work to a load such as an electrical generator or the like coupled to a shaft 12. Powerplant 10 typically includes an air intake 14 for receiving filtered air 16 for compression. A low pressure compressor 18 is positioned downstream of air intake 14, an intermediate pressure compressor 20 is positioned downstream of low pressure compressor 18, and a high pressure compressor 22 is positioned downstream of low pressure compressor 20 for producing a high pressure, high temperature downstream flow. A high pressure turbine 24 is mechanically coupled to high pressure compressor 22 by a shaft 26, an intermediate pressure turbine 28 is positioned downstream of high pressure turbine 24 and coupled to intermediate pressure compressor 20 by a shaft 30, and a low pressure turbine 32 is positioned downstream of intermediate pressure turbine 28 and mechanically coupled to low pressure compressor 18 by a shaft 34. Shaft 12 is in turn coupled to low pressure compressor 32 which serves as a power turbine. The compressors and turbines employed may be of conventional aircraft design, or of other types typically used in gas turbine driven powerplants. Those skilled in the art will appreciate that additional or fewer compressors and turbines may be utilized.

An intercooler 36 is positioned downstream of intermediate pressure compressor 20 and coupled to the output of intermediate pressure compressor 20 by an air input duct 38. Intercooler 36 also includes an air output duct 40 which is coupled to the input of high pressure compressor 22. A dual heat exchanger 42 is positioned downstream of high pressure compressor 22 and coupled to the output of high pressure compressor 22 by an air input duct 44. Dual heat exchanger 42 also includes an air output duct 46 which is coupled to the input of combustor 48. Both the intercooler 36 and the dual heat exchanger 42 comprise vessels containing coils of tubing through which a fluid is pumped in order to effect an exchange of heat between the fluid inside the tubes and the counter current flow of air outside the tubes. Intercooler 36 includes a first section 50 and a second section 52, and dual heat exchanger 42 includes a first section 54 and a second section 56 through which these coils pass. Those skilled in the art will appreciate that other intercooler designs could be employed, and that the intake air 16 could be chilled or otherwise cooled prior to entry into air inlet 14 to enhance cooling or as an alternative to employing an intercooler.

In intercooler 36, a continuous coiled tube 58 extends through first section 50 and second section 52, whereas in dual heat exchanger 42, first section 54 includes a coiled tube 60 and second section 56 includes a separate coiled tube 62. The outlet of coils 58 is coupled to the inlet of a pump 64 by means of a pipe 66. The outlet of pump 64 is coupled to the inlet of coils 62 by means of a pipe 68. The outlet of coil 62 is coupled to the inlet of coils 58 by means of a pipe 70. In this way, a recirculating stream of fluid (closed loop) is maintained between the intercooler 36 and the second section 56 of the dual heat exchanger 42.

In coils 60 contained in the first section 54 of the dual heat exchanger 42, a separate, one way flow of fluid is maintained.

Figure 3:
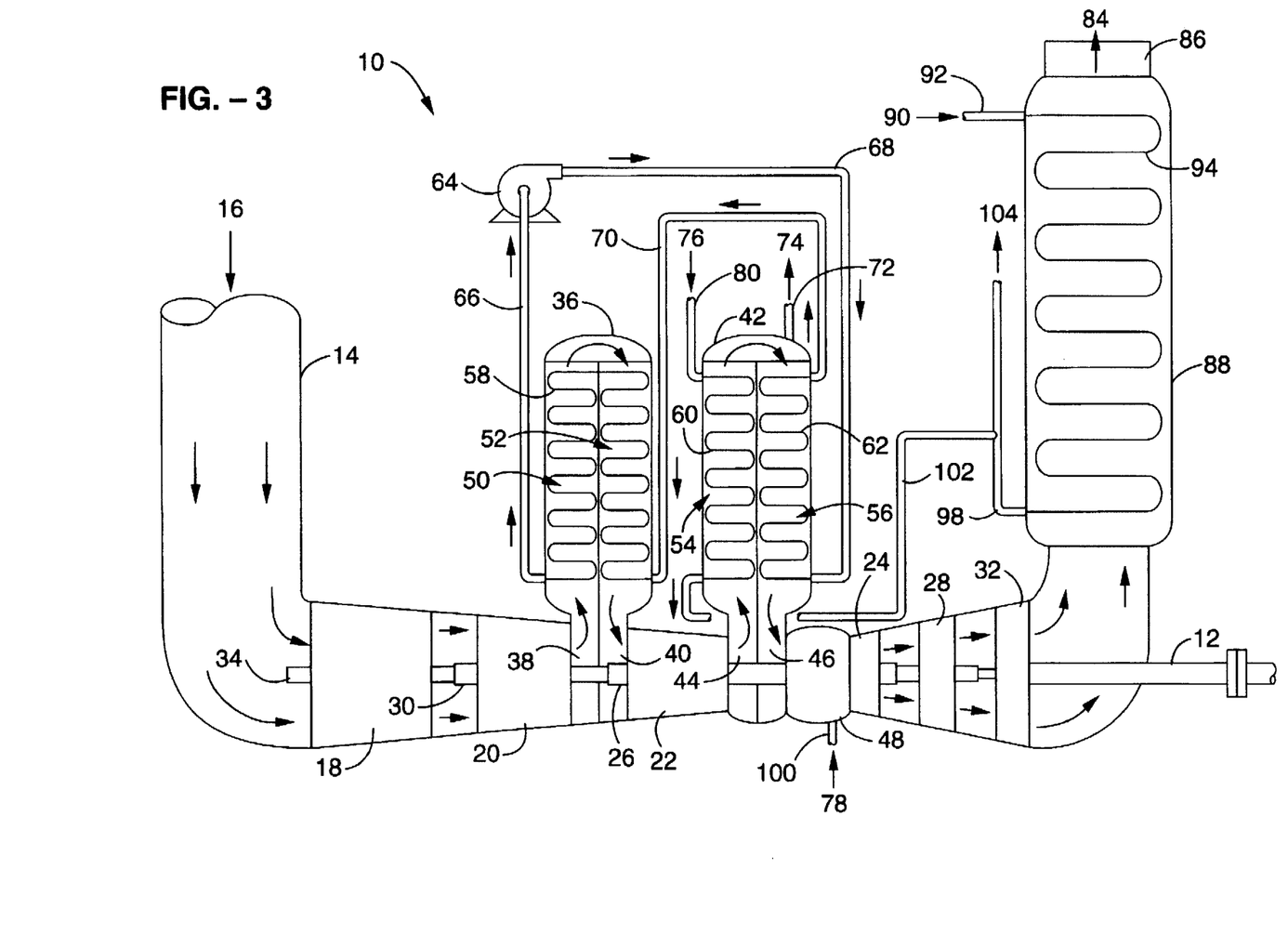
FIG. 3 is a schematic diagram of an alternative embodiment of the powerplant shown in FIG. 2 in which the fuel is injected directly into the combustor and the first stage of the dual heat exchanger uses water only to recover compressor discharge heat and produce steam for a steam cycle or industrial process.

Partially compressed air exiting the intermediate pressure compressor 20 is routed through the intercooler 36 past the coils 58 containing a cold fluid flowing in a countercurrent stream. This configuration serves to simultaneously cool the partially compressed air and heats the fluid in the intercooler coils. The cooled air then enters the high pressure compressor 22. Upon exiting the high pressure compressor 22, the air temperature is again elevated, and the air then flows through the two stages of the high pressure heat exchanger 42. The coils on the compressor discharge side of the heat exchanger (first section 54) contain either a counter current flow of cold water for production of steam or a counter current flow of a cold combustible/water (fuel) mixture to produce a highly desirable low pollutant producing high temperature, diluted fuel (potentially hydrogen rich) which would be directed to the combustor. (In FIG. 1, the configuration using the cold combustible/water (fuel) mixture is depicted. If only water is used in the first stage of high pressure heat exchanger 42, then a separate flow of fuel to the combustor is required as shown in FIG. 3). This counter current flow of water or combustible/water (fuel) cools the high temperature compressed air several hundred degrees Fahrenheit. The first section 54 of the dual heat exchanger 42 thus provides a far more effective cooling medium for the turbine metal components than the standard uncooled high pressure air and also allows a heat sink to be created for the return to the cycle of low grade heat that cannot be captured in conventional powerplant designs. When the cooled compressed air reaches the end of this first set of coils 60, a small portion of the cooled compressed air is bled through cool air outlet 72, and the cool air 74 is used for cooling duties. The remaining air flows past the second set of fluid containing coils 62 in second section 56 and into the combustor 48. This second set of fluid containing coils 62 contains the fluid that carries away heat from the intercooler 36. This heated fluid flows in a counter current manner in such a way as to simultaneously reheat the cooled compressed air on its way from the first section 54 of the dual heat exchanger 42 to the combustor 48 and cool the fluid in the tubes for return to the intercooler coils 58 for further cooling duty. In this manner, virtually all of the heat extracted by the intercooler 36 is returned to the fully compressed air before it enters the combustor 48, providing a substantial reduction in cycle energy losses.

The first section 54 of the dual heat exchanger 42 simultaneously vaporizes and superheats a mixture of water 76 and a combustible component 78 introduced through inlet 80 and flowing through coils 60, and cools the high pressure compressor discharge air to approximately 145 degrees Fahrenheit. The heated combustible effluent, diluted low-$NO_x$ fuel gas, flowing through the coils 60 in the first section 54 of the dual heat exchanger 42 fuels the gas turbine combustor 48 through fuel feed pipe 82. The power turbine shaft 12 transmits the work potential generated to the load, and the exhaust gas stream 84 courses out a stack 86.

The first section 54 of the dual heat exchanger 42 positioned after the high pressure compressor 22 may be a conventional hot-air-to-fuel heat exchanger or, for more effective heat exchange and the simultaneous production of a superior, hydrogen-rich fuel, may be a methane/steam reformer if the air temperature is high enough to permit an efficient production of hydrogen. Use of a catalytic methane/steam reformer takes advantage of the highly endothermic reaction that takes place in such reformers, and the resulting production of hydrogen for the fuel fed to the combustor allows higher firing temperatures with reduced formation of $NO_x$. If the air temperature is not high enough to permit the efficient production of hydrogen, an "auto-thermal" reformer may be employed in which air is mixed with the methane in order to provide oxygen so that the exothermic energy of combustion offsets the endothermic energy of the reformation reaction. In all cases where a methane/steam reformer is used, however, care must be taken to remove substantially all of the sulfur that may initially exist in the fuel in order to avoid contamination (poisoning) of the catalyst.

If a methane/steam reformer is not employed in the first section 54 of dual heat exchanger 42, an alternative exists to obtain a hydrogen-rich low-$NO_x$ fuel. The high temperature steam/fuel mixture exiting the first section 54 of the dual heat exchanger 42 can be passed through a bed of steam reforming catalyst. In this configuration, the steam/fuel mixture exiting the first section 54 of the dual heat exchanger 42 must be of sufficient pressure to enter the combustor 48. Both the water and combustible entering the heat exchanger will have been raised to sufficient pressure (approximately 50 to 100 psia greater than the pressure in the combustor). The first section 54 of the dual heat exchanger 42 ideally has two requirements to meet: (1) it must reduce the compressed air temperature to the lowest practical level, and (2) it must produce as much steam/fuel mixture at the required pressure as possible. Lowering the air temperature in the first section 54 of the dual heat exchanger 42 to the lowest practical level requires generating steam at multiple pressures. However, in this instance, we have use for only one pressure of steam/fuel mixture-that pressure which will allow entry to the combustor and we wish to convert all of the heat extracted from the air side to steam at the required pressure. To allow the extraction of steam/fuel at multiple pressures while still meeting the need for injecting steam/fuel into the combustor at the required pressure, a novel arrangement can be employed.

By way of example, but not of limitation, if the steam/fuel mixture is removed at four points in the first section 54 of the dual heat exchanger 42, there will be four pressure levels, two in excess of required pressure and two below the required pressure. The two highest pressure steam/fuel flows would be routed through a steam turbine (not shown) connected by a shaft to a steam compressor into which the two lower pressure steam/fuel flows will be routed. The higher pressure steam/fuel will drive the turbine and compressor so that the steam/fuel exhausting from the compressor and the turbine will be one combined flow at the required pressure. This example uses a single shaft at one speed. An option that would increase efficiency would use two concentric shafts at two different speeds. The same single pressure product steam can also be achieved, albeit less efficiently, by the use of a steam jet compressor (ejector).

The compression is achieved in this instance without any moving parts but requires a higher ratio of high pressure to low pressure steam.

Figure 2:
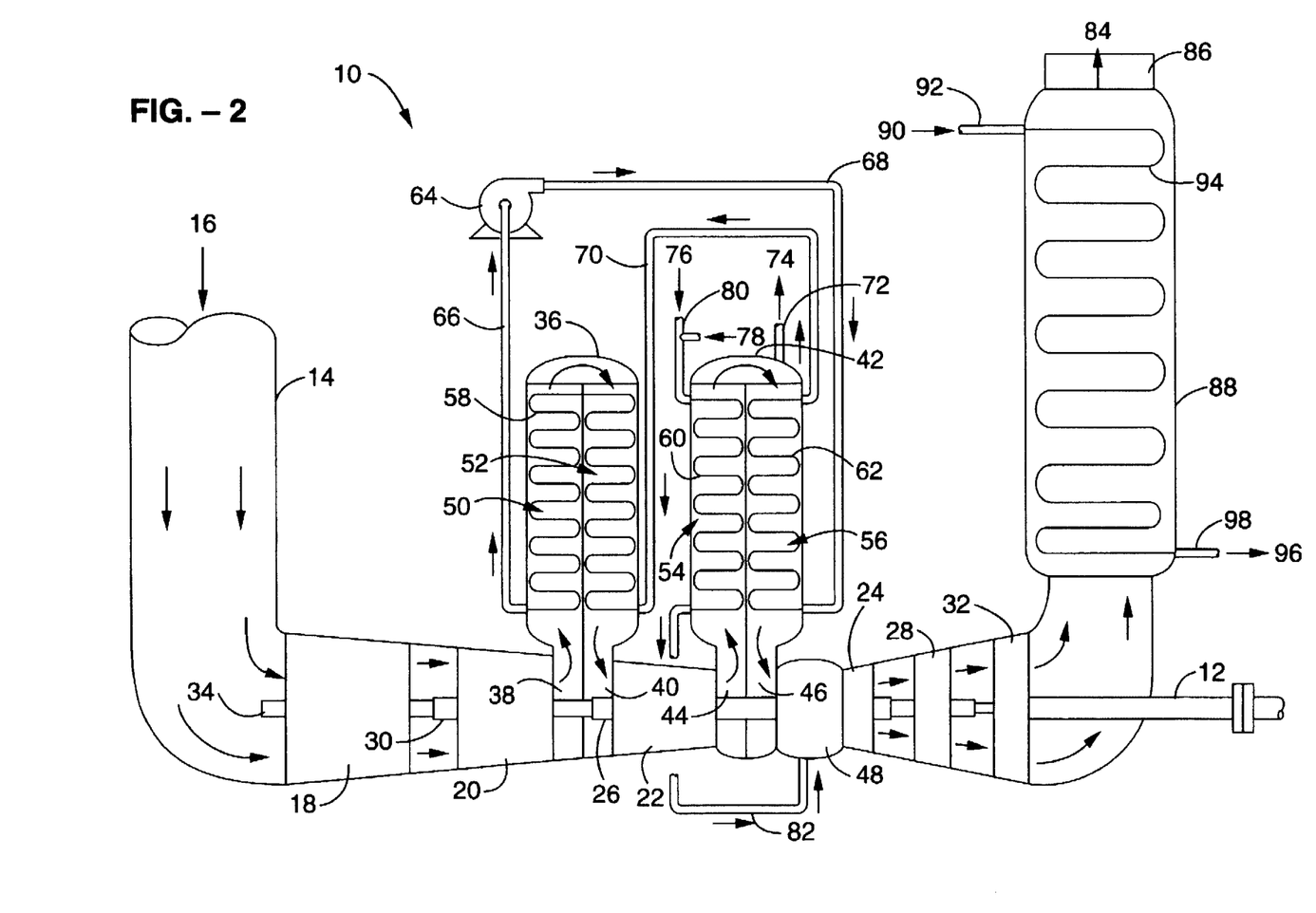
FIG. 2 is a schematic diagram of the "combined cycle/cogeneration" version of the gas turbine driven powerplant shown in FIG. 1, in which a once-through heat recovery steam generator is employed to recover exhaust heat and produce steam for a steam cycle or industrial process.

Referring now to FIG. 2, a second embodiment is shown which comprises a "combined cycle"/cogeneration thermally enhanced intercooled gas turbine powerplant. This embodiment comprises the same equipment described with reference to FIG. 1 except that the exhaust stream exiting the low pressure turbine will flow through a downstream heat recovery steam generator 88 before coursing out the stack 86. The heat recovery steam generator 88, which serves as a means for recuperating exhaust heat, may be conventional as shown in FIG. 2. Here, water 90 is introduced into a water inlet 92 and flows through coils 94. The heat from the exhaust gasses will generate steam 96 which is available at steam outlet 98 for use in driving a steam turbine (bottoming cycle) to produce more electricity in a "combined cycle" arrangement, or for use in industrial process in a cogeneration arrangement. A third embodiment is shown in FIG. 3. Here, the configuration is identical to that of FIG. 2 except that the combustible component 78 is not introduced into coils 60 with water 76. In this case, steam is generated from water 76 flowing through coils 60 and the steam is available for process duty in a cogeneration application. In this case, fuel 78 must be directly introduced into the combustor 48 through a fuel inlet 100. The steam generated in coils 60 is routed through a steam outlet pipe 102 which joins with steam outlet 98 and combines with the steam generated in coils 94 to provide a steam supply 104.

Figure 4:
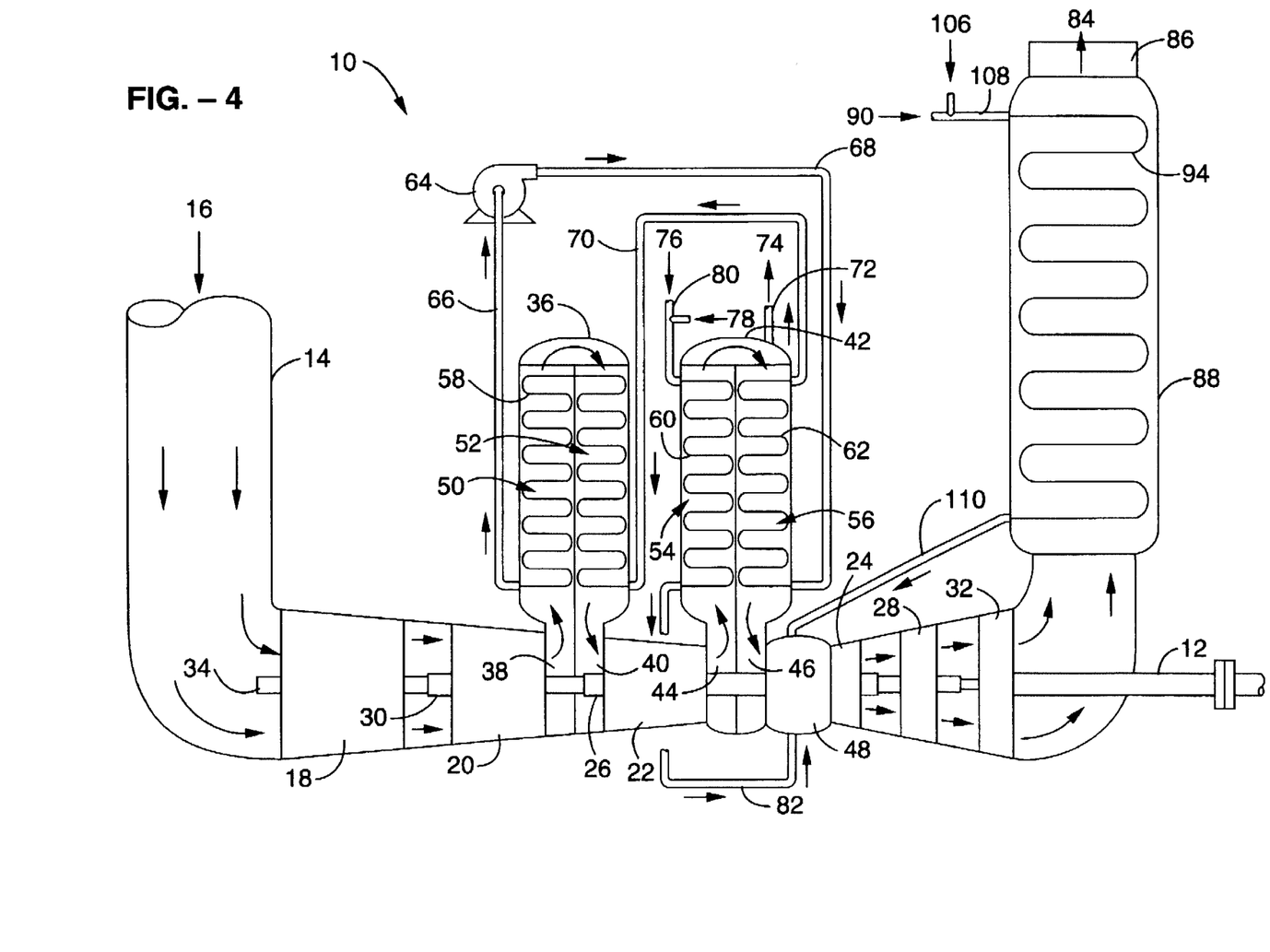
FIG. 4 is a schematic diagram of a fully steam injected version of the gas turbine driven powerplant shown in FIG. 1.

Referring to FIG. 4, a fourth embodiment which may be called the "steam injected" thermally enhanced intercooled gas turbine powerplant is shown. Here, the powerplant comprises the same equipment described with reference to FIG. 1 except that the exhaust stream exiting low pressure turbine 32 flows through a once through heat recovery steam generator 88 (previously described with reference to FIG. 2 and FIG. 3) before coursing out the stack. In this embodiment, a two phased feed of combustible/water mixture is used in the once through heat recovery steam generator 88 in the same manner as in the first section 54 of the dual heat exchanger 42 (1) to produce a superheated mixture of steam/combustible that will be directed to the combustor and (2) to recuperate heat from the exhaust stream in a thermodynamically efficient manner. Water 90 and a combustible 106 are introduced into coils 94 through fuel inlet 108, and the resultant fuel mixture is routed to combustor 48 through outlet pipe 110. The advantage of a two phased feed is to allow vaporization of the water to occur throughout the initial portion of the heat exchange path. The methane gas phase provides volume for the flashed water vapor. This greatly enhances the heat carrying capacity of the fluid, and mitigates a common thermodynamic problem at the cold end of the heat exchanger. With water only as the heated fluid, the water temperature linearly approaches the temperature of the heating fluid until a minimum practical difference ("pinch point") is reached. This, in turn, establishes the size of the required heat transfer surface. By facilitating vaporization, the two phase feed generates a nonlinear temperature approach to the heating fluid, allowing a significant reduction in the heating surface and reducing thermodynamic irreversibilities.

Figure 5:
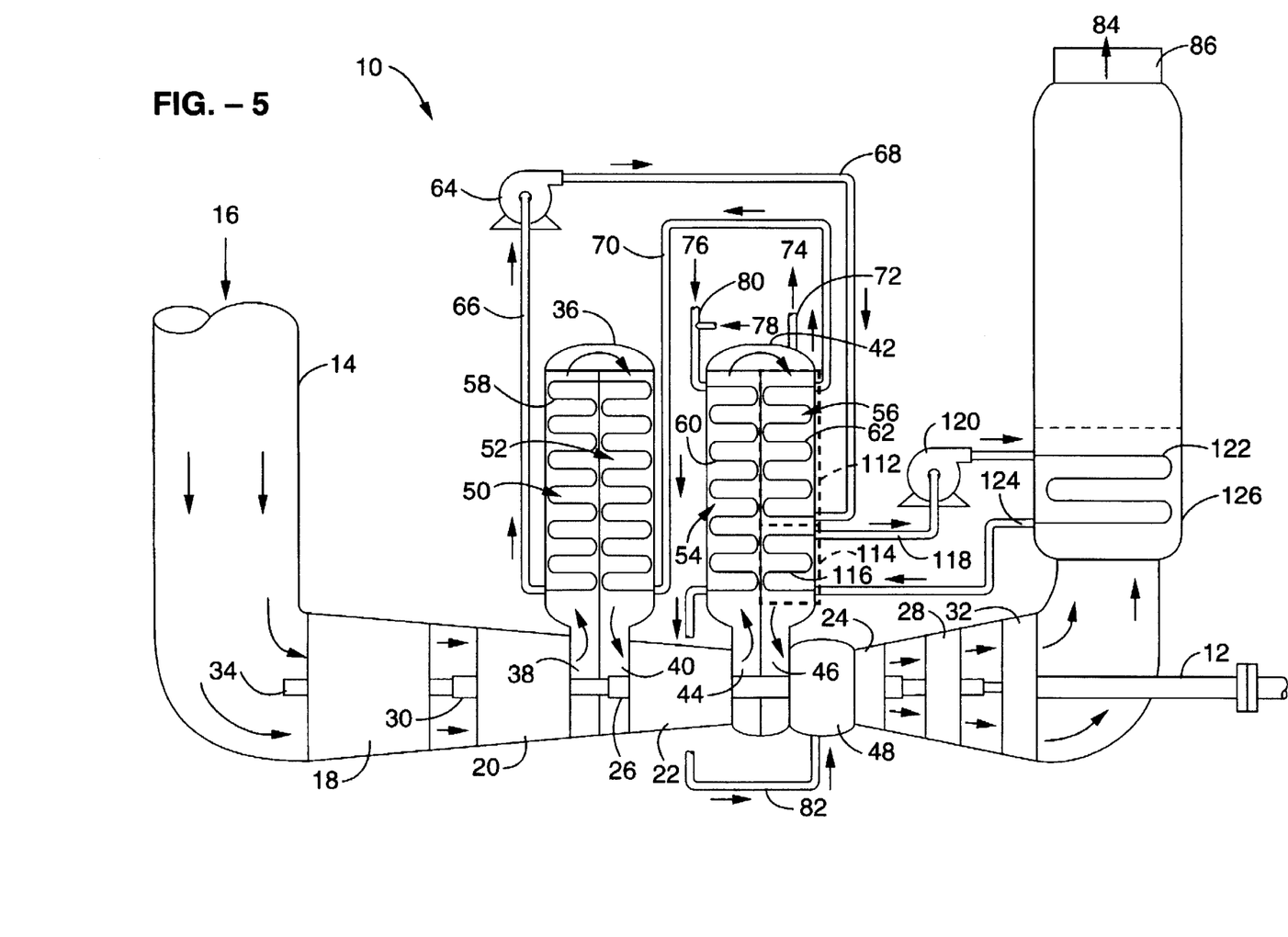
FIG. 5 is a schematic diagram of the "simple cycle" gas turbine driven powerplant shown in FIG. 1 employing a separate closed loop high temperature exhaust heat exchanger.

Referring now to FIG. 5, a fifth embodiment of the powerplant of the present invention can be seen. Here, the powerplant comprises the same equipment as described with reference to FIG. 1, except that the second section 56 of the dual heat exchanger 42 now includes of two "sub-stages": (1) a first low temperature stage 112 for returning intercooler heat to the cooled high pressure discharge air flow as in the embodiments of FIG. 1 through FIG. 4, and (2) a second high temperature stage 114 for returning as much exhaust heat as possible to that air flow without requiring steam raising. The first stage 112 is defined by the closed loop of heat exchange fluid flowing between the intercooler 36 and the dual heat exchanger 42 as described with reference to FIG. 1, and the second stage 114 is defined by a separate closed loop of heat exchange fluid flowing between the high temperature portion of the exhaust stream and the high temperature portion of the second section 56 of dual heat exchanger 42. Cooler heat exchange fluid from coils 116 exits through low temperature feed pipe 118 and, using a pump 120 or the like, is pumped through coils 122 in the exhaust stream where it absorbs most of the available exhaust temperature above that fluid temperature. This hotter heat exchange fluid then flows back to the second stage coils 116 through high temperature feed pipe 124 where most of its increased temperature is transferred to the high pressure air flowing past coils 116 tubes and into the combustor 48. The heat exchange fluid, thus cooled back to its original temperature, is then available to be recycled back through the high temperature exhaust heat exchanger 126.

Figure 6:
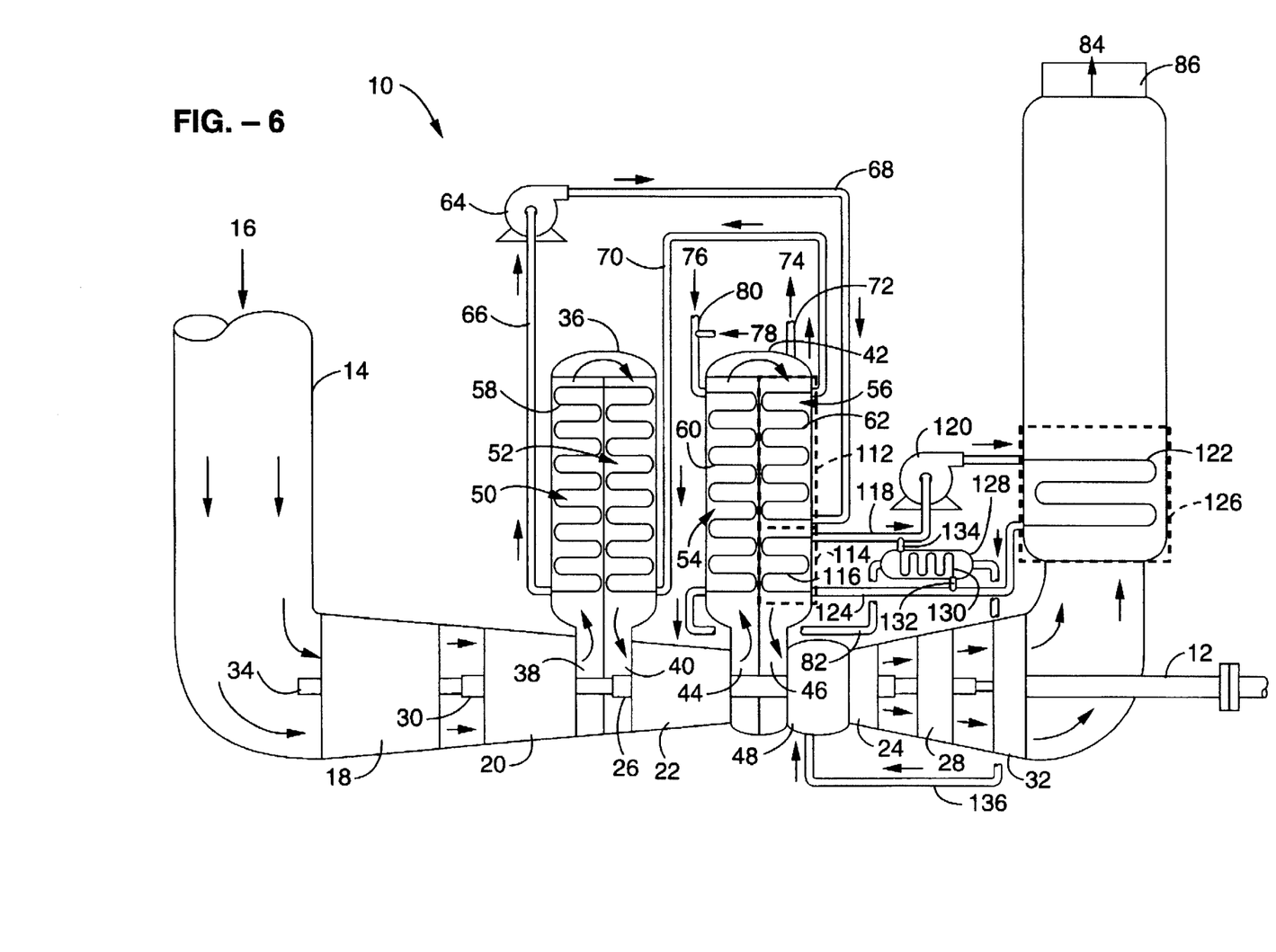
FIG. 6 is a schematic diagram of an alternative embodiment of the powerplant shown in FIG. 5 in which a steam/fuel temperature boost heat exchanger is employed.

Referring to FIG. 6, it is anticipated that the temperature of the high pressure compressor 22 discharge air in an intercooled cycle will often be significantly lower than the temperature of the exhaust as it exits low pressure turbine 32. Because this high pressure compressor discharge air temperature controls the temperature of the steam/fuel mixture created in the in-tube side of the first section 54 of the dual heat exchanger 42, if the high pressure compressor discharge air temperature is significantly lower than the low pressure turbine exhaust temperature, the steam/fuel mixture will also be well below that exhaust temperature, thus allowing the steam/fuel to accept high temperature exhaust heat. In order to accomplish this, an additional heat exchanger 128 may be installed in the configuration of FIG. 5, which is what FIG. 6 depicts. The purpose of this small heat exchanger (which may be called the "steam/fuel temperature boost heat exchanger") would be to allow the steam fuel mixture exiting the first pass of the dual heat exchanger 42 through fuel feed pipe 82 to absorb additional heat from the high temperature exhaust heat exchanger 126. This will permit more exhaust heat to be absorbed and returned to the cycle before water is required for possible additional heat recuperation. It also balances the mass flow being heated with the mass flow of the exhaust being cooled, thereby increasing heat exchange effectiveness.

The steam/fuel temperature boost heat exchanger 128 comprises a high pressure shell similar in composition to the shell of the dual heat exchanger 42. The high pressure shell is necessary because the steam/fuel mixture exiting the in-tube side of the first pass 54 of the dual heat exchanger is at a sufficient pressure to permit it to enter the combustor 48, and that mixture will pass through the steam/fuel temperature boost heat exchanger 128 counter current to an in-tube flow of heat exchange fluid. After passing through the steam/fuel temperature boost heat exchanger 128, the steam/fuel will enter the combustor 48 at a temperature approaching the temperature of the exhaust as it exits low pressure turbine 32. The counter current flow of heat exchange fluid inside the tubes 130 of the steam/fuel temperature boost heat exchanger 128 will flow through an inlet 132 coupled to the high temperature feed pipe 124 carrying heat transfer fluid between the high temperature exhaust heat exchanger 126 and the second stage 114 of the second section 56 of the dual heat exchanger 42. The hotter heat exchange fluid from the high temperature exhaust heat exchanger 126 will be divided between the high temperature feed pipe 124 running to the second stage 114 of the second section 56 of the dual heat exchanger 42 and inlet 132 at the hot end of the steam/fuel temperature boost heat exchanger 128. After passing through the tubes 130 of the steam/fuel temperature boost heat exchanger 128 and imparting some of its heat to the steam/fuel, the cooled heat exchange fluid exits through outlet 134 and joins the flow of heat exchange fluid from the cool end of the second stage 114 of the second section 56 of the dual heat exchanger 42 from which point the combined flows of cooled heat exchange fluid will flow back through the high temperature exhaust heat exchanger through low temperature feed pipe 118. The heated steam/fuel mixture is then routed to the combustor 48 through fuel feed pipe 136.

Figure 7:
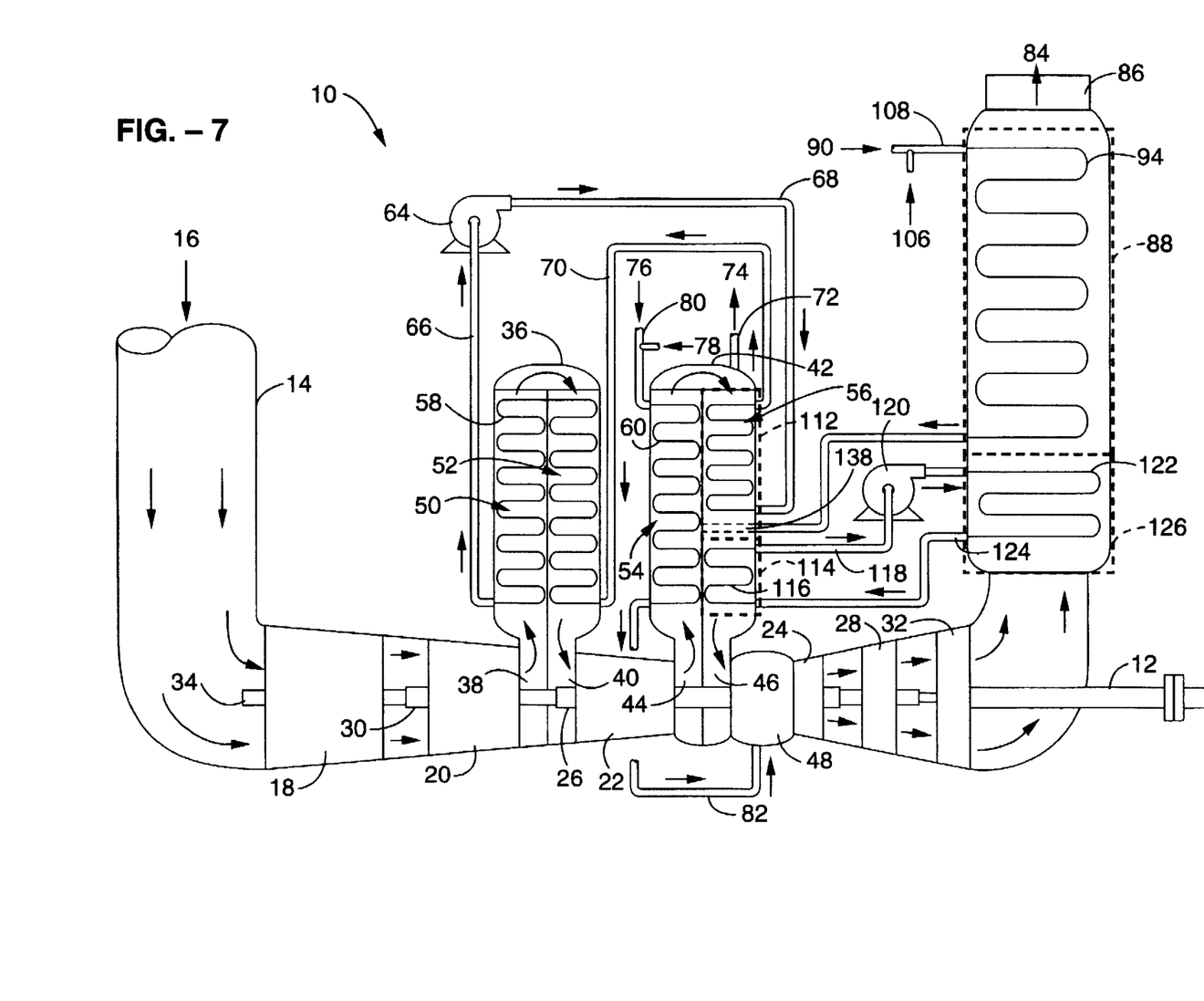
FIG. 7 is a schematic diagram of the steam injected gas turbine driven powerplant shown in FIG. 4 employing a separate closed loop high temperature exhaust heat exchanger (as in FIG. 5) and injecting the steam or steam/fuel mixture from the exhaust heat recovery steam generator into the flow of the high pressure air between the two stages of the second pass of the dual heat exchanger.
Figure 8:
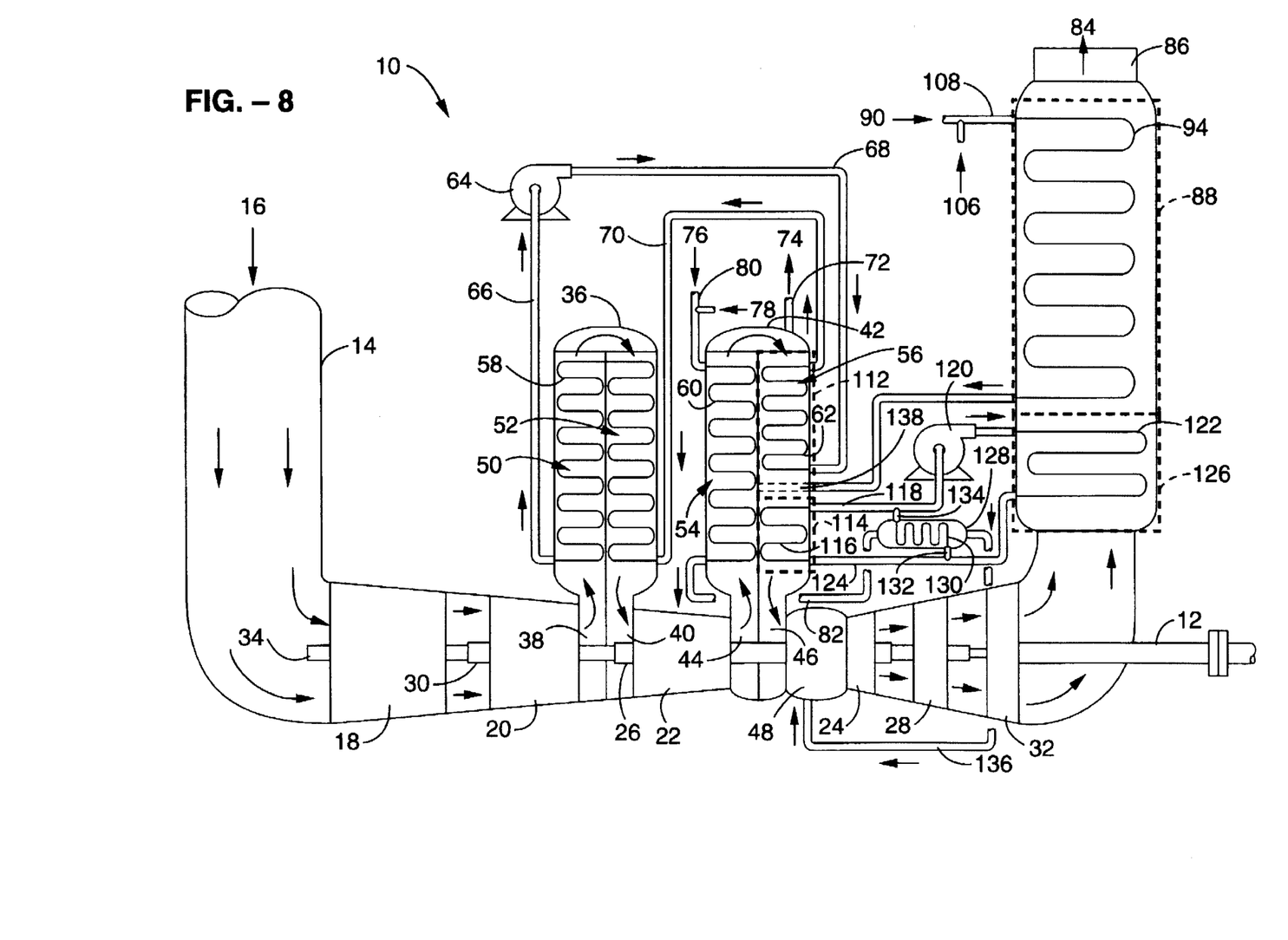
FIG. 8 is a schematic diagram of an alternative embodiment of the powerplant shown in FIG. 7 in which a steam/fuel temperature boost heat exchanger is employed.

Note that in the fifth and sixth embodiments of FIG. 5 and FIG. 6, the exhaust is released to the surroundings after the high temperature portion of the exhaust heat has been recovered by the high temperature exhaust heat exchanger 126. Referring to FIG. 7, in the seventh embodiment, the powerplant comprises the same equipment as in FIG. 5 except that the remaining heat in the exhaust is recovered through the use of a once-through heat recovery steam generator 88 as discussed with reference to FIG. 4, and the steam/fuel mixture (or steam alone if desired) created in the coils 94 of the heat recovery steam generator 88 is injected into the high pressure air flowing through the second section 56 of the dual heat exchanger 42 between the first stage 112 and the second stage 114 through injection pipe 138. This injection of the steam or steam/fuel mixture augments the mass flowing to the combustor 48 producing more power and more efficient heat exchange in the second stage 114 of the second section 56 of the dual heat exchanger 42. FIG. 8 shows an eighth embodiment of the powerplant in accordance with the present invention comprises the same equipment as described with reference to FIG. 7, except that the steam/fuel temperature boost heat exchanger 128 described with reference to FIG. 6 is also included.

Figure 9:
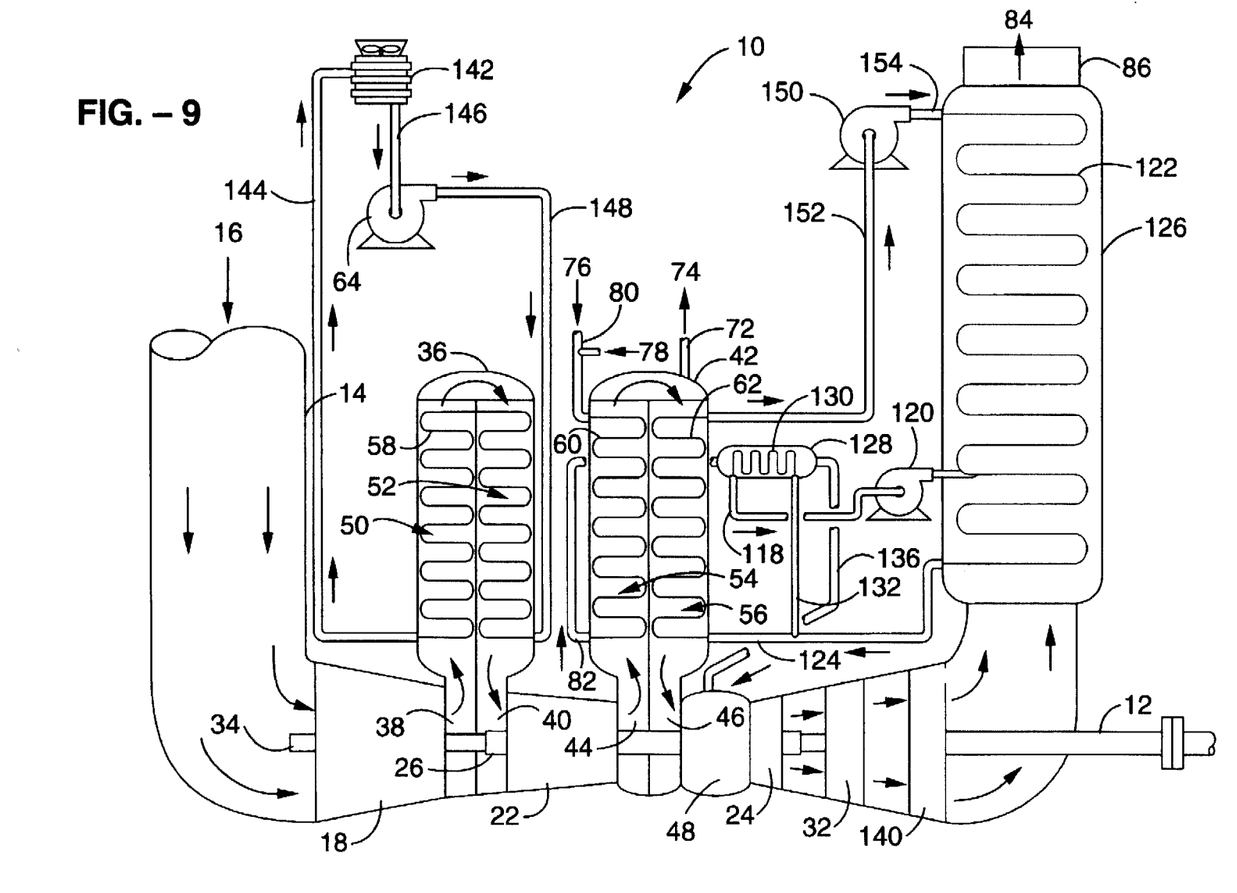
FIG. 9 is a schematic diagram of a gas turbine driven powerplant in accordance with the present invention in which the heat from intercooling between compressor stages is rejected in a cooling tower, the first stage of the dual heat exchanger performs the same functions as in the embodiments shown in FIG. 1 through FIG. 8, the second stage of the dual heat exchanger is used to recuperate as much of the exhaust heat as possible without steam raising, and a steam/fuel temperature boost heat exchanger is employed as in the embodiments shown in FIG. 6 and FIG. 8.
Figure 10:
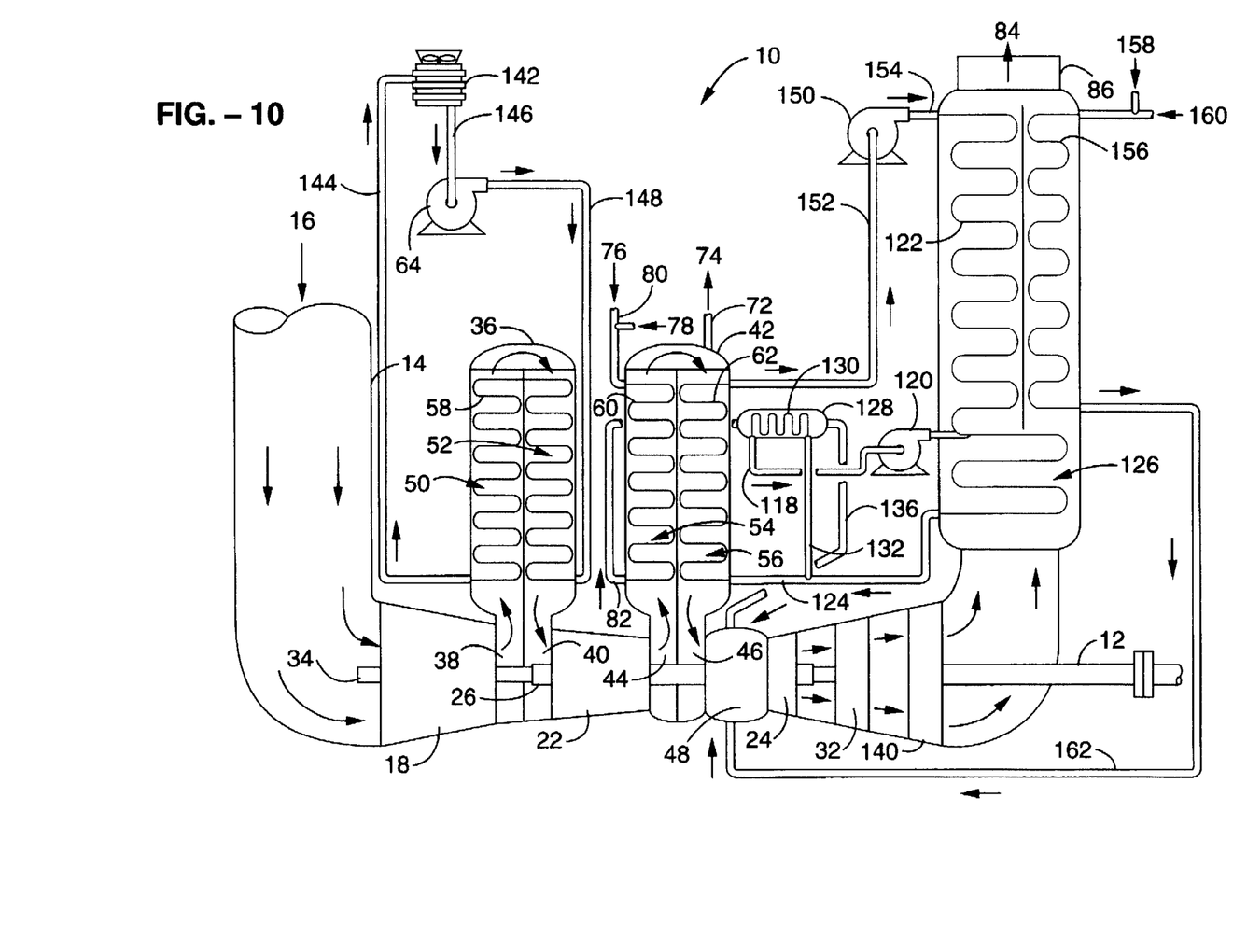
FIG. 10 is a schematic diagram of an alternative embodiment of the gas turbine driven powerplant shown in FIG. 9 in which an additional exhaust heat exchanger is employed to simultaneously recuperate exhaust heat and raise steam for injection into the combustor to augment mass flow and increase power generation.

The ninth and tenth embodiments of FIG. 9 and FIG. 10, respectively, employ the same unique dual heat exchanger following the final compressor stages as is employed in all other embodiments, but unlike the other embodiments, in the embodiments of FIG. 9 and FIG. 10, the heat of intercooling is rejected through a cooling tower and the second stage of the heat exchanger is now devoted to exhaust heat recuperation duties. Referring more specifically to FIG. 9, it can be seen that the intermediate pressure compressor 20 found in FIG. 1 through FIG. 8 has been eliminated, as has the corresponding intermediate pressure turbine 28. In addition, a free spinning (not connected to a compressor) power turbine 140 has been added to drive shaft 12.

Note that, in this embodiment, the outlet of coil 58 is coupled to the inlet of a cooling tower 142 by means of a pipe 144. The outlet of cooling tower 142 is connected to the inlet of pump 64 by means of a pipe 146. The outlet of pump 64 is connected to the inlet of coil 58 by means of a pipe 148. If, as in one possible design, the fluid circulating through the intercooler tube 58 is water, the cooling tower 142 may be designed to allow the hot water to fall through the tower while air fans blow air past the falling water, thus evaporating a portion of it and rejecting the heat in the water. In this design, additional water would be continuously added at the outlet of the cooling tower to replace the water that evaporates in the cooling tower and maintain a constant flow of water through the intercooler tubes. Those skilled in the art will appreciate that additional cooling tower designs or means of rejecting the intercooler heat may be employed that may permit the fluid in the intercooler coils to be some heat exchange fluid other than water. If so, a closed loop of such fluid would be maintained between the intercooler 36 and the cooling tower 142.

Partially compressed air exiting the low pressure compressor 18 is routed through the intercooler 36 past the coils 58 containing a cold fluid flowing in a countercurrent stream. This configuration serves to simultaneously cool the partially compressed air and heats the fluid in the intercooler coils. The cooled air then enters the high pressure compressor 22. Upon exiting the high pressure compressor 22, the air temperature again has been elevated, and the hot air then flows through the two stages of the high pressure heat exchanger 42. The coils 60 on the compressor discharge side of the heat exchanger (first section 54) contain either a one way counter current flow of cold water 76 for production of steam or a one way counter current flow of a mixture of cold water 76 and a combustible 78 which are introduced at inlet 80 to produce a highly desirable low pollutant producing high temperature, diluted fuel (potentially hydrogen rich) which would be directed to the combustor. (In FIG. 9, the configuration using the cold combustible/water (fuel) mixture is depicted. If only water is used in the first stage of high pressure heat exchanger 42, then a separate flow of fuel to the combustor is required as shown in FIG. 3). This counter current flow of water or of combustible/water (fuel) cools the high temperature compressed air several hundred degrees Fahrenheit. The first section 54 of the dual heat exchanger 42 thus provides the effective cooling medium for the turbine metal components and for creation of a heat sink offered by previous embodiments.

When the cooled compressed air reaches the end of this first set of coils 60, a small portion of the cooled compressed air is bled through the cool air outlet 72, and cool air 74 is used for cooling duties. The remaining air flows past the second set of fluid carrying coils 62 in second section 56 and into the combustor 48. This second set of fluid containing coils 62 contains fluid that is used to recuperate heat from exhaust heat exchanger 126 containing fluid carrying coils 122. This heated fluid flows in a counter current through coils 62 in such a way as to simultaneously reheat the cooled compressed air on its way from the first section 54 of the dual heat exchanger 42 to the combustor 48 and cool the fluid in the tubes for return to the exhaust heat exchanger coils 122 to repeat the heat recuperation circuit.

The outlet of coil 62 is connected to the inlet of pump 150 by means of pipe 152. The outlet of pump 150 is connected to the inlet of coil 122 by means of pipe 154. The cooled fluid entering coil 122 is heated by its flow countercurrent to the flow of exhaust gas 84 and the heated fluid from the exhaust heat exchanger 126 is then divided between the high temperature feed pipe 124 running to the second section 56 of the dual heat exchanger 42 and the inlet 132 to steam/fuel temperature boost heat exchanger 128 which is similar in design and function to that described in reference to FIG. 6 and also shown in FIG. 8. The outlet of the fluid carrying coil 130 of this heat exchanger 128 is connected to the inlet of pump 120 by means of pipe 118. The outlet of pump 120 is connected to coil 122 at the point in coil 122 where the heat exchange fluid is approximately the same temperature in coil 122 as the fluid temperature exiting the pump 120, and pump 120 is balanced with pump 150 and valved to maintain a flow of fluid in coil 122 that is counter current to the exhaust flow and to prevent any flow of fluid from coil 122 back through the stem/fuel temperature boost heat exchanger 128. The stem fuel mixture exiting tube 60 of the first stage of the dual heat exchanger is directed via pipe 82 to the inlet of the pressure vessel of the steam/fuel temperature boost heat exchanger 128 where it flows counter current to the in tube flow of heat exchange fluid in coil 130. The steam/fuel extracts heat from the heat exchange fluid and then flows via pipe 136 to the combustor 48. The heated heat exchange fluid that enters the inlet of coil 62 flows counter current to the flow of cooled air through the second section 56 of the dual heat exchanger 42, imparting heat to the air and simultaneously becoming cool for reuse in the exhaust heat exchanger.

In this manner, a large mount of the exhaust heat is recovered and the steam/fuel is heated to a temperature approaching the temperature of the exhaust as it exits the power turbine 140 without requiring stem raising in the exhaust stream. However, because the mass flow through the exhaust 84 (consisting of both air and fuel) will be greater than the mass flow through the second stage of the dual heat exchanger 56 (consisting only of air), not all of the recoverable heat in the exhaust will be recuperated in the ninth embodiment. A tenth embodiment adds an additional means of exhaust heat recovery in order to recuperate this additional heat.

Referring to FIG. 10, the powerplant comprises the same equipment described with reference to FIG. 9 except that the heat recovery coils in the exhaust stack 86 are configured differently. The high temperature portion of coil 122 is located in a high temperature section 126 to absorb all of the available high temperature exhaust heat. At the point in the stack 86 where temperature of the fluid in coil 122 is approximately equal to the temperature of the fluid exiting pump 120, the exhaust stack gas will be divided in order to match the exhaust mass flowing past the remainder of coil 122 with the cooling capability of the fluid in that coil. The remaining exhaust will flow past a second coil 156 in which a two phased feed of water 158 and compressed air 160 (which may be delivered as a side stream from bleed air outlet 74) will flow countercurrent to the flow of the exhaust. The water and air will flash to steam in the tubes of coil 156 and will be directed via pipe 162 to the combustor 48 to augment the mass flowing past the turbines and increase power generation. Accordingly, this embodiment includes means to recuperate exhaust heat and raise steam for injection into the combustor.

Those skilled in the art will appreciate that embodiments shown in FIG. 9 and FIG. 10 could also be constructed without the steam/fuel temperature boost heat exchanger 128, thereby simplifying the design, by eliminating pump 120 and the coils, pipes, and containment vessel that make up that heat exchanger. In such a design, the steam fuel exiting the first pass of the dual heat exchanger would be directed to the combustor through pipe 82 as in FIG. 1. This simplification might occur if the capital and operating cost of the additional equipment is more than the expected savings in fuel cost from increased efficiency of the cycle.

In all embodiments in which a steam/fuel mixture (a low $NO_x$ fuel gas) is created, and in particular in those embodiments in which additional steam may be raised in exhaust heat recovery and eventually injected into the combustor, care will need to be taken to ensure stability of the combustor flame. If combustion stability is a problem as a result of dilution by steam of methane, the combustion problem can be solved by creation of or introduction of a highly combustible hydrogen component to the fuel gas stream.

One strategy for creating hydrogen in the fuel gas stream would be to pass some or all of the steam/fuel mixture over a suitable bed of catalyst so as to achieve chemical reformation of the fuel gas prior to combustion. This may be desirable to do in any event as a strategy for reducing the formation of oxides of nitrogen ($NO_x$), but even if these emissions are controlled in some other manner, an "auto-thermal" reformer may be used either to create hydrogen-rich fuel prior to entry to the combustor or to create a side stream of hydrogen-rich fuel for use in a pilot flame designed to ensure that the remaining dilute fuel exhibits combustor flame stability. The auto-thermal reformer requires the injection of a small quantity of air to provide oxygen. The oxygen reacts with the fuel gas to provide exothermic energy of combustion to offset the endothermic energy of the reformation reaction. This allows an efficient reformation of the fuel gas and maintains or increases the temperature of the fuel gas as it passes over the catalyst bed. The air can be taken directly from the air stream exiting the high pressure compressor prior to entering the dual heat exchange or from some other point prior to entry into the combustor. If the pressure of the air is insufficient to enter the auto-thermal reformer because of the pressure of the steam/fuel mixture (whose pressure is controlled at the entry point of the water and methane into the system), it can be boosted with an ejector or other pressure-boosting device. Without this air, the endothermic reformation of the fuel gas would still occur, but to a lesser degree and would not be sufficient to provide a hydrogen concentration required to ensure a stable pilot and/or combustor flame.

As can be seen, therefore, the present invention employs an intercooler between compression stages to lower the temperature of the partially compressed air and reduce the amount of work required to complete the compression in the high pressure compressor. The first stage of a dual heat exchanger lowers the high pressure compressor discharge temperature by several hundred degrees Fahrenheit to approach ambient temperature. The temperature of the compressed air exiting the first stage of the dual heat exchanger is set in all embodiments by the first stage exchanger inlet temperature of the water or combustible/water mixture fuel feed, which is assumed to be at ambient temperatures (approximately 59 degrees Fahrenheit). The temperature of the cooled compressed air exiting this first stage will be designed to approach the temperature of the water, limited on the basis of overall economics to a 10 to 15 degree Fahrenheit "pinch point". In all embodiments, the temperature of the cooled compressed air is thus set and is therefore available for metal component cooling duty and low grade heat recovery duty. The remainder of this cooled air is reheated in the second stage of the dual heat exchanger by the counter current flow of heated fluid from the intercooler or exhaust heat exchanger prior to entering the combustor.

Accordingly, it will be seen that this invention provides a high efficiency, low pollutant gas turbine driven powerplant with superior turbine cooling capabilities. Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. A gas turbine driven powerplant, comprising:
    (a) first compressor means for producing a downstream flow of air;
    (b) intercooler means for transferring heat from said flow of air to a fluid, said intercooler means including a first fluid carrying coil, said intercooler means positioned downstream of said first compressor means;
    (c) cooling tower means for transferring heat from said fluid to ambient air, said cooling tower means coupled to said first fluid carrying coil;
    (d) second compressor means for receiving said cooled air and producing a higher pressure downstream flow of air, said second compressor means positioned downstream of said intercooler means;
    (e) a heat exchanger, said heat exchanger including a first section positioned downstream of said second compressor means, said heat exchanger including a second section positioned downstream of said first section, said first section including a second fluid carrying coil wherein heat contained in compressed air flowing through said second section of said heat exchanger is transferred to a fluid flowing through said second fluid carrying coil, said second section including a third fluid carrying coil, said heat exchanger including a coolant air outlet positioned downstream of said first section and upstream of the second section;
    (f) a combustor positioned downstream of said second section of said heat exchanger wherein said fluid flowing through said second fluid carrying coil flows into said combustor;
    (g) a turbine positioned downstream of said combustor; and
    (h) exhaust heat recovery means for transferring heat contained in exhaust gasses produced by said combustor to a fluid, said exhaust heat recovery means positioned downstream of said turbine, said exhaust heat recovery means including a fourth fluid carrying coil coupled to said third fluid carrying coil.

2. A gas turbine driven powerplant as recited in claim 1, further comprising means for recuperating exhaust heat and raising steam for injection into said combustor.

3. A gas turbine driven powerplant as recited in claim 1 or 2, further comprising fuel temperature boost heat exchanger means for transferring heat contained in said exhaust gasses to fuel flowing into said combustor.

* * * * *